(12) United States Patent
Challal et al.

(10) Patent No.: US 8,491,038 B2
(45) Date of Patent: Jul. 23, 2013

(54) AUTOMOBILE COMPRISING A FRONT BUMPER WITH A CENTRAL PORTION EXTENDING AS FAR AS THE BONNET OF SAID VEHICLE

(76) Inventors: Hicham Challal, Versailles (FR); Olivier Veuillot, Limeil Brevannes (FR)

( * ) Notice: Subject to any disclaimer, the term of this patent is extended or adjusted under 35 U.S.C. 154(b) by 0 days.

(21) Appl. No.: 13/145,797

(22) PCT Filed: Jan. 20, 2010

(86) PCT No.: PCT/FR2010/050084
§ 371 (c)(1),
(2), (4) Date: Nov. 10, 2011

(87) PCT Pub. No.: WO2010/084284
PCT Pub. Date: Jul. 29, 2010

(65) Prior Publication Data
US 2012/0043786 A1     Feb. 23, 2012

(30) Foreign Application Priority Data

Jan. 23, 2009 (FR) ..................................... 09 00305

(51) Int. Cl.
*B60R 21/34* (2006.01)
*B60R 19/52* (2006.01)

(52) U.S. Cl.
USPC ............ 296/187.09; 296/187.04; 296/193.09; 180/68.4

(58) Field of Classification Search
USPC ............... 296/187.04, 187.09, 193.09, 193.1, 296/193.11, 203.02; 180/68.4, 68.6
See application file for complete search history.

(56) References Cited

U.S. PATENT DOCUMENTS

| 7,044,517 B2 * | 5/2006 | Hyuga ........................ 296/193.1 |
| 7,114,587 B2 * | 10/2006 | Mori et al. .................... 180/68.3 |
| 7,322,639 B2 * | 1/2008 | Takata et al. ............. 296/187.09 |
| 7,571,955 B2 * | 8/2009 | Nagae et al. ............. 296/187.09 |

(Continued)

FOREIGN PATENT DOCUMENTS

| DE | 203 21 022 | 10/2005 |
| EP | 1 561 647 | 8/2005 |
| FR | 2 910 870 | 7/2008 |
| WO | 2005 120908 | 12/2005 |

OTHER PUBLICATIONS

International Search Report issued Jun. 4, 2010 in PCT/FR10/050084 filed Jan. 20, 2010.

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

An automobile including a front cross-member, an attachment element arranged at the rear of the cross-member, a bonnet that closes off an engine compartment and including one free edge, and a front bumper mounted in front of the front cross-member and including a central portion that extends as far as the bonnet and includes a tab for attaching to the attachment element. The attachment tab includes a frangible area, located to the front of the attachment area and capable of breaking, and the frangible area is arranged next to an empty space formed in the compartment, with a view to having the central portion of the bumper bend into the empty space when the frangible area breaks.

6 Claims, 2 Drawing Sheets

U.S. PATENT DOCUMENTS

| | | | |
|---|---|---|---|
| 7,651,156 B2* | 1/2010 | Park | 296/187.04 |
| 8,075,048 B2* | 12/2011 | Kimoto et al. | 296/193.11 |
| 8,220,863 B2* | 7/2012 | Schaefer et al. | 296/187.04 |
| 2003/0192727 A1* | 10/2003 | Mori et al. | 180/68.4 |
| 2004/0195020 A1* | 10/2004 | Suwa et al. | 180/68.4 |
| 2005/0253420 A1 | 11/2005 | Roussel | |
| 2009/0295193 A1* | 12/2009 | Park | 296/187.04 |
| 2010/0283289 A1 | 11/2010 | Challal et al. | |
| 2012/0043786 A1* | 2/2012 | Challal et al. | 296/203.02 |
| 2012/0161473 A1* | 6/2012 | Schaefer | 296/187.09 |

OTHER PUBLICATIONS

French Search Report issued Sep. 23, 2009 in French Patent Application No. 09 00305 filed Jan. 23, 2009.

* cited by examiner

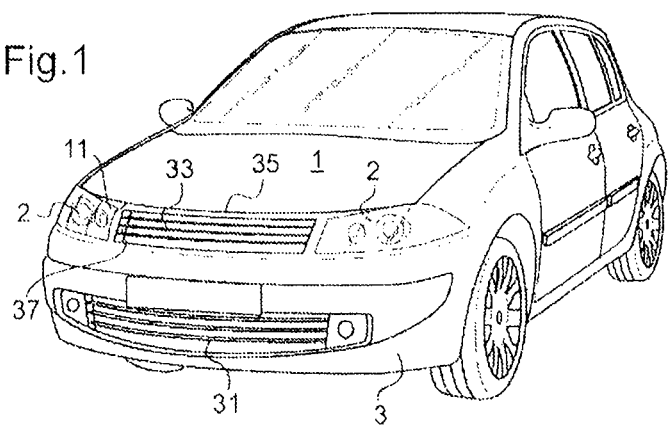
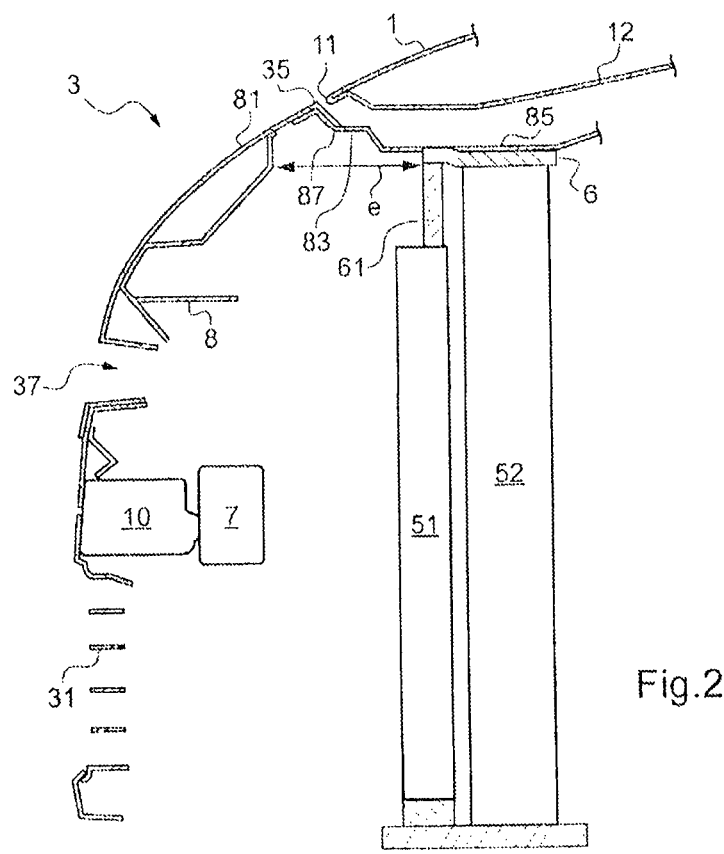

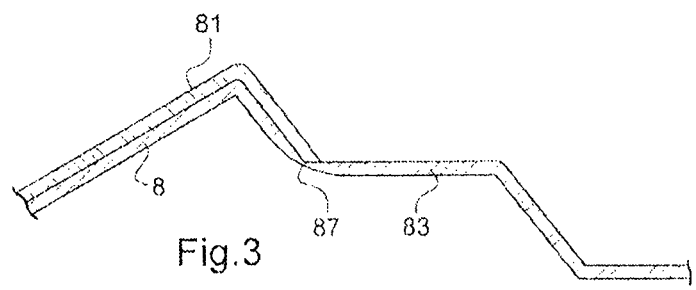
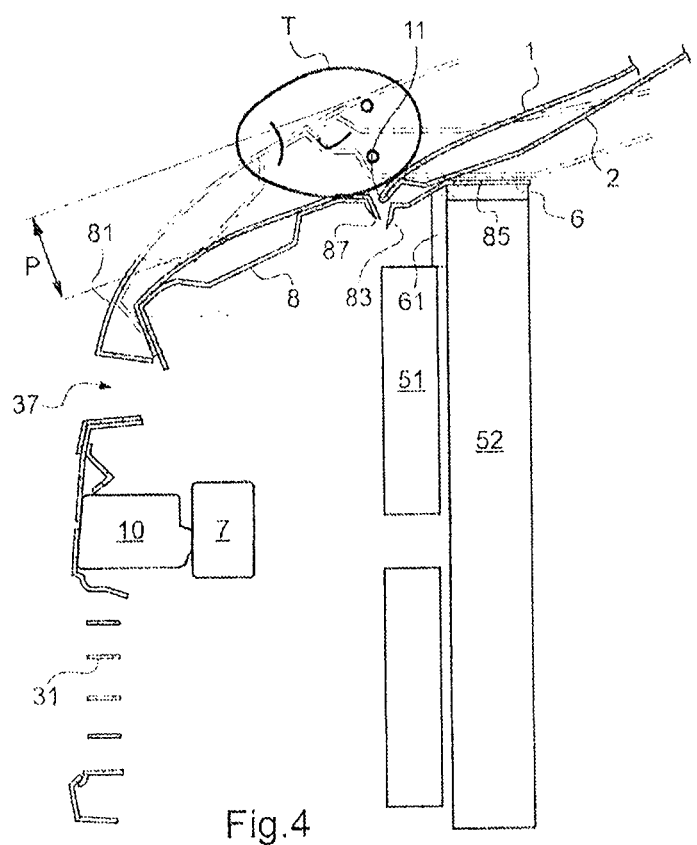

AUTOMOBILE COMPRISING A FRONT BUMPER WITH A CENTRAL PORTION EXTENDING AS FAR AS THE BONNET OF SAID VEHICLE

BACKGROUND

Most motor vehicles comprise a bonnet or hood in which the upper air inlet grille is formed. This air inlet grille is generally positioned between the front headlamps. The bumper or fender is positioned below the aforementioned air inlet grille. In the event of a frontal impact with a small-sized pedestrian, such as a child, for example, the head of the pedestrian strikes the bonnet, substantially, above the upper air inlet grille. The natural flexibility of the bonnet, which is made of sheet steel, is able to absorb part of the impact, through deformation of the bonnet.

However, for the last few years, and for reasons of style, motor vehicles have had very bulky front bumpers. These bumpers comprise a central part which rises up toward the bonnet, between the front headlamps. It is often this part of the bumper which bears the upper air inlet grille. The bonnet itself is shortened and its free edge is situated fairly high up between the headlamps. In the event of a frontal impact with a small-sized pedestrian, the head of the pedestrian strikes not the bonnet but the central part of the bumper. Bumpers of this type are made up of several components which, for functional reasons, are very rigid. Such bumpers can therefore seriously injure a pedestrian, particularly the head of a small-sized pedestrian.

BRIEF SUMMARY

It is an object of the present invention to propose a motor vehicle which comprises a bumper like the aforementioned one and which reduces the risk of serious injury in a collision with a pedestrian, particularly a pedestrian of small size.

With the object of solving this problem, the present invention proposes a motor vehicle comprising, in a known manner:
- a structure which comprises a front crossmember and which defines, behind said front crossmember, an engine compartment;
- a fixing element, secured to said structure and arranged in said engine compartment;
- a bonnet or hood which closes said engine compartment and has a free edge substantially parallel to said crossmember;
- a front bumper or fender mounted in front of said front crossmember and which has a central part extending toward said bonnet, said central part having an upper portion delimited by a top edge which faces said free edge of the bonnet, said upper portion comprising a fixing tab which extends into said engine compartment and comprises an attachment region fixed to said fixing element.

According to the invention, and characteristically, said fixing tab comprises a frangible region, situated in front of said attachment region, and which is able to break when a force exceeding a given rupture value is applied to said frangible region, and said frangible region is arranged in the region of an empty space, formed in said compartment, by means of which contrivance, when said frangible region breaks, the central part of said bumper flexes into said empty space.

Such a vehicle is able to dissipate some of the kinetic energy of the impact in the breakage of the frangible region and in the deformation of the fixing tab. In addition, the Applicant Company has been able to demonstrate that such a structure is also capable of reducing contact forces (that is to say the force applied by that region of the vehicle that is in contact with the pedestrian's body, on the body of the pedestrian; this force being generated by the movement of the vehicle during the impact) which are lower and able to avoid serious trauma. Such a vehicle therefore proves to be particularly advantageous in reducing the risk of head injury, in an impact with a small-sized pedestrian whose head is liable to strike the bumper of the vehicle.

According to one embodiment, the central part comprises a reinforcement covered with a skin, and said reinforcement bears said fixing tab. The skin may be made of a relatively flexible material while the reinforcement is rigid.

The fixing tab may extend over the entire width of said central part in order to afford the latter optimal attachment.

The frangible region may be formed of a special material, the presence of perforations or the like which weakens the fixing tab. It may be obtained by any means capable of weakening the material of the fixing tab at a given point. According to one embodiment, the frangible region is formed of a reduction in thickness of said fixing tab.

Advantageously, said frangible region is positioned near said free edge of said bonnet, which allows the good deformation both of the bonnet and of the fixing tab, it being possible in effect for the head or other body part of the pedestrian to enter the engine compartment at the space created behind the bumper, without striking any rigid element that could cause injury.

According to one embodiment, the empty space corresponds substantially to the space which separates the internal face of said front bumper from said fixing element.

The depth of said empty space is, for example, comprised between 50 mm and 100 mm.

According to one particular embodiment, said central part comprises an air inlet grille.

BRIEF DESCRIPTION OF THE DRAWINGS

Other specifics and advantages of the invention will become apparent from the description given hereinafter of one particular embodiment of the invention, which is given by way of nonlimiting indication with reference to the attached drawings in which:

FIG. 1 depicts a perspective view of the vehicle according to the invention;

FIG. 2 depicts a view in longitudinal section of the front of the vehicle of FIG. 1;

FIG. 3 depicts a partial view, in longitudinal section, of the front bumper embodiment depicted in FIGS. 1, 2 and 4; and FIG. 4 depicts a view in longitudinal section of the front of the vehicle of FIG. 1 at the moment of impact with a small-sized pedestrian.

DETAILED DESCRIPTION

FIG. 1 illustrates one particular embodiment of a vehicle according to the invention. This vehicle comprises an engine compartment closed by a substantially horizontal bonnet 1. The bonnet 1 is hinged in the region of the windscreen or windshield and has a free edge 11, situated at the front of the vehicle. The vehicle comprises, on each side, a front headlamp 2 positioned substantially below the bonnet 1. The vehicle is fitted at the front with a bumper or apron 3. This apron 3 comprises, in its bottom part, a lower air inlet grille 31. The apron 3 extends laterally to the vehicle, under the headlamps 2. The apron 3 also has a central part 33 which extends between the front headlamps 2 of the vehicle, toward the free edge 11 of the bonnet 1. The headlamps 2 are thus partially surrounded by the apron 3. The central part 33 of the apron 3 has an upper portion, positioned between the headlamps 2 and which ends at a top edge 35 parallel to the free edge 11 of the bonnet 1. The free edge 11 of the bonnet 1 is positioned near the top edge 35 of the apron 3 to form a continuous surface. An upper air inlet grille 37 is formed between the headlamps 2, in the central part 33.

With reference to FIG. 2, the vehicle comprises an engine compartment in which the radiators 51 and 52 are fixed. The radiators 51 and 52 are fixed, one in front of the other, on a radiator support 6 which is itself fixed to the chassis frame side rails (not depicted) of the structure of the vehicle. The support 6 extends above and below the radiators 51 and 52. Because the radiator 51 which is positioned furthest forward in the engine compartment is not as tall as the other radiator, the support 6 comprises a vertical spacer piece 61 which serves to fix the top portion of the radiator 51. The front ends of the chassis frame side rails (not depicted) are connected by a front crossmember 7. The apron 3 comprises a reinforcement 8, made of rigid plastic. This reinforcement 8 is covered with a skin 81, made of flexible plastic, situated on the outside of the vehicle. A shock-absorbing element 10 is positioned in front of the front crossmember 7. This shock-absorbing element extends along the entire length of the crossmember 7. The lower air intake grille 31 is positioned under the crossmember 7 while the upper air inlet grille 37 is positioned above the crossmember 7.

As FIG. 2 depicts, the apron 3 comprises a fixing tab 83 that forms an integral part of the reinforcement 8 and that extends the top edge 35 of the apron. This fixing tab 83 extends into the engine compartment toward the radiator support 6. The fixing tab 83 has a substantially horizontal attachment portion 85 situated forward of its free end. The fixing tab 83 extends transversally to the apron 3 over the entire width of the portion of the reinforcement 8 that is situated in the central part 33 of the apron 3. The fixing of the attachment portion 85 of the fixing tab 83 does not limit the scope of the invention. The fixing tab 83 may be screwed or riveted to the radiator support 6. The fixing tab 83 comprises a frangible region 87 which is positioned near the top edge 35 of the apron 3, at the edge of the skin 81. The bonnet 1 comprises a lining 12, situated inside the engine compartment. The bonnet 1 is therefore hollow, giving it a certain degree of flexibility.

As FIG. 2 depicts, an empty space is created under the fixing tab 83. The fixing tab 83 and the upper portion of the central part 33 of the apron 3, particularly the top edge 35, can thus, when the frangible region breaks, as explained later on, bend into the engine compartment without striking any rigid element such as the radiator 51 which would cause them to deform and could inflict trauma on the struck pedestrian. The dimensions of this empty space are dependent on the size of the fixing tab 83 and on the material used for the reinforcement 8.

By way of indication, the empty space may have a depth e, measured along the longitudinal dimension of the vehicle, of the order of 50 to 100 mm, and, for example, of the order of 80 mm. The depth e of the empty space corresponds to the distance which separates the internal face of the reinforcement 8 from the radiator support 6 and, more particularly, from the spacer piece 61 of this support 6.

FIG. 3 depicts the frangible region 87 in greater detail.

The frangible region 87 corresponds to a line of reduction in thickness of the reinforcement 8. This line extends across the entire width of the fixing tab 83. The frangible region 87 is positioned under the skin 81, substantially in the region of the edge of the latter which is situated in the engine compartment. The fixing tab 83 corresponds to the portion of the reinforcement 8 that protrudes beyond the skin 81 and extends into the engine compartment toward the radiators 51 and 52. The skin 81 covers the reinforcement 8 on the external face of the apron 3 and, over a short length, enters the engine compartment at the top edge 35, under the bonnet 1. The frangible region 87 therefore corresponds to the edge of the fixing tab 83 which is connected to the reinforcement 8. The frangible region forms a line or a strip parallel to the free edge 11 of the bonnet 1 and is situated near this free edge 11. The effect of this arrangement will be explained in greater detail with reference to FIG. 4.

The skin 81 is made of a flexible plastic. The reinforcement 8 is formed of a more brittle and more rigid plastic. For example, it is possible to choose a plastic which breaks when its elongation reaches the order of 5 to 10%.

The way in which the invention works will now be explained with reference to FIG. 4.

In FIG. 4, dotted lines depict the position of the bonnet 1 and of the central part 33 of the apron 3 prior to the impact with a pedestrian.

When the head T of a small-sized pedestrian strikes the upper portion of the central part 33 of the apron 3, the frangible region 87 breaks along the entire width of the fixing tab 83, that is to say the entire width of the central part 33 of the apron 3. The central part 33 of the apron 3 is therefore no longer fixed to the vehicle, particularly to the support 6. It crumples, notably at its upper portion, flexing into the engine compartment, toward the bottom of the vehicle. The top edge 35 enters the engine compartment, forward of and above the radiator 51, which is the furthest forward in the engine compartment. At the same time, the impact with the head T of the pedestrian causes the bonnet 1 to deform. The free edge 11 of the bonnet 1 enters the engine compartment and bends substantially toward the radiators 51 and 52. Because the frangible region 87 is positioned near the free edge 11 of the bonnet 1, it is directly subject to the impact with the head of the pedestrian and soon breaks. Moreover, this arrangement makes it possible to create two lips, one formed by the top edge 35 and the other by the free edge 11 of the bonnet 1, which part under the effect of the impact, in the engine compartment, in the empty space formed under the fixing tab 83. This affords effective protection to the head of the struck pedestrian.

As depicted in FIG. 4, when the deformation is at its maximum, the lining 12 of the bonnet 1 comes into contact with the radiator support 6 above the radiator 52. The fixing tab keeps its attachment region 87, fixed to the radiator support 6. That portion of the fixing tab 83 that is situated forward of the attachment region bends toward the radiator 51.

By way of indication, the deformation of the apron 3 and of the bonnet 1 causes the top edge 35 and the free edge 11 to move by a maximum amplitude P of the order of 10 mm.

In the impact with a pedestrian, the kinetic energy of the impact is dissipated, partly in the breakage of the frangible region 87, and partly in the deformation both of the bonnet 1 and of the central part 33 of the apron 3. Further, when the head T of the pedestrian is, as has been depicted in FIG. 4, resting against the top edge 35 of the apron 3 and on the free edge 11 of the bonnet 1, contact forces are applied to the head T of the pedestrian throughout the length of time for which the vehicle is still in motion and the head T remains in contact with the aforementioned parts of the vehicle. The Applicant Company has observed that, not only is the kinetic energy of the impact effectively dissipated, as previously explained, but also the forces of contact, during the impact, can be reduced to a value of below 200 kg, which corresponds to the admissible limit for the cerebral skull. The central part 33 of the apron 3 of the invention is hard enough for normal use of the apron (that is to say protect the structure of the vehicle) and, because of the presence of the frangible region 87, is also flexible enough not to cause serious traumatic injury to the head of a small-sized pedestrian.

The invention claimed is:

1. A motor vehicle comprising:
a front crossmember;
an engine compartment behind the front crossmember;
a fixing element comprising a radiator support arranged in the engine compartment;
a bonnet or hood that closes the engine compartment and includes a free edge substantially parallel to the front crossmember; and
a front bumper or fender mounted in front of the front crossmember and including a central part extending toward the bonnet, the central part including an upper portion delimited by a top edge that faces the free edge of the bonnet, the upper portion including a fixing tab that extends into the engine compartment and includes an attachment region fixed to the fixing element;
the fixing tab including a frangible region in front of said attachment region and configured to break when a force exceeding a given rupture value is applied to the frangible region,
wherein an empty space that corresponds substantially to the space which, in a longitudinal dimension of the vehicle, separates an internal face of the front bumper from the fixing element, is formed, in the engine compartment, under the fixing tab, and the frangible region is arranged in the region of the empty space, near the free edge of the bonnet, which contrivance, when the frangible region breaks, the central part of the bumper flexes into the empty space toward the bottom of the vehicle.

2. The vehicle as claimed in claim 1, wherein the central part comprises a reinforcement covered with a skin, and the reinforcement bears the fixing tab.

3. The vehicle as claimed in claim 1, wherein the fixing tab extends over an entire width of the central part.

4. The motor vehicle as claimed in claim 1, wherein the frangible region is formed of a reduction in thickness of the fixing tab.

5. The vehicle as claimed in claim 1, wherein the depth of the empty space is between 50 mm and 100 mm.

6. The motor vehicle as claimed in claim 1, wherein the central part comprises an air inlet grille.

* * * * *